United States Patent [19]
Richter

[11] 3,761,007
[45] Sept. 25, 1973

[54] METAL LAMINATED MATERIAL
[76] Inventor: Ulf Richter, 5909 Wasserscheide, Germany
[22] Filed: Jan. 20, 1972
[21] Appl. No.: 219,367

Related U.S. Application Data
[62] Division of Ser. No. 1,333, Jan. 8, 1970, Pat. No. 3,672,033.

[52] U.S. Cl. .................................................. 228/3
[51] Int. Cl. ..................... B23k 21/00, B23p 3/02
[58] Field of Search .................... 29/180 S, 191.6, 29/493, 421 E, 470.1, 486, 472.1; 228/3

[56] References Cited
UNITED STATES PATENTS

| | | | |
|---|---|---|---|
| 687,636 | 11/1901 | Koch et al. | 29/180 S |
| 1,862,263 | 6/1932 | Gottscholk | 29/180 S |
| 1,904,026 | 4/1933 | Field et al. | 29/180 S |
| 3,055,095 | 9/1962 | Barry | 29/508 X |
| 3,205,574 | 9/1965 | Brennecke | 29/498 X |
| 3,233,312 | 2/1966 | Cowan et al. | 29/470.1 X |
| 3,360,848 | 1/1968 | Saia | 29/421 X |
| 3,377,693 | 4/1968 | Fukumoto | 29/470.1 |

Primary Examiner—J. Spencer Overholser
Assistant Examiner—Ronald J. Shore
Attorney—Craig et al.

[57] ABSTRACT

The present disclosure is directed to a laminated metallic composite and to a process for the production of said composites which comprises placing metallic spacers between the metal sheets to be bonded, said spacers being wound in a helical shape from a wire with the axis of the helices oriented substantially parallel with respect to the metal sheets, applying a layer of explosive to the upper sheet of metal and detonating said explosive to produce impingement and welding of the upper sheet with the remaining sheets.

5 Claims, 1 Drawing Figure

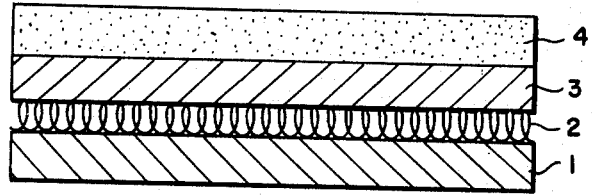

METAL LAMINATED MATERIAL

This is a division of application Ser. No. 1,333, filed Jan. 8, 1970, now U.S. Pat. No. 3,672,033.

BACKGROUND OF THE INVENTION

The present invention relates to a laminate metallic material and to a process for the production of a metal laminated material by means of explosive cladding, wherein metallic spacers are inserted between the metallic sheets to be bonded together.

It is conventional to produce laminated material from several metallic plates by placing the plates to be bonded on top of one another, with a space remaining therebetween. A layer of explosive is applied to the upper metal sheet which can be detonated by means of a suitable primer. By the shock wave of the detonation, the upper sheet is accelerated toward the lower sheet. Upon impingement, welding occurs. Metallic spacers disposed between the sheets are welded into the material by the high pressure.

The spacers must be fashioned so that they are sufficiently strong to carry the upper sheet. In addition, they must permit the air present between the metal sheets to escape during the blasting step so that no dammed up pressure (pressure surge) is produced. Furthermore, the requirement must be met that the material of the spacers will not be included in the laminated material because such inclusions lead to faults in the laminate.

Numerous types of spacers for use in explosive cladding have been used heretofore. Thus, it is known to scatter metallic particles in the form of small grains between the metal sheets to be bonded. This process is suitable only in case of very small distances between the metal sheets, and it exhibits the disadvantage that a large amount of foreign material is incorporated in the clad product. Another disadvantage resides in the fact that the grains, particularly when the metal sheets must be further transported after being placed on one another, fall out readily.

It is furthermore known to provide the upper metal sheet wth bulges or indentations in order to obtain a desired and sufficient spacing. This way, no foreign material is included during the explosive cladding. However, it is necessary to prepare the respective metal sheet beforehand by means of a shaping operation. As a result, a non-uniform stress distribution is produced in the material, thereby creating the danger of tension crack corrosion. Besides, bonding flaws can be observed in the cladding later on, at the points of the impressed indentations.

In another construction of the conventional spacers, corrugated or zig-zag shaped, bent metal strips are provided which are disposed between the metal sheets to be bonded in an upright position. In this process, relatively large inclusions of foreign material in the metal strips result, said material extending in accordance with the shape of the metal strips. Additionally, the metal strips represent a considerable amount of air resistance. The air displaced from the space upon the collision of the metal sheets can damm up at these places and form eddies, whereby bond flaws are produced.

Finally, it is known to produce spacers from plastic foam, which spacers can optionally be additionally provided with metallic reinforcements. Such spacers can be employed only in connection with lightweight cover sheets. If the spacers are compressed too strongly at individual points, which can be the case with slightly warped cover sheets, charred spots, and not bonded points, are produced at those places.

SUMMARY OF THE INVENTION

An object of the present invention is to avoid the prior art disadvantages in the manufacture of metal laminate material.

Another object of the present invention is to provide an improved metal laminate material and an explosive bonding or cladding process for the production of a metal laminated material of the above-mentioned type wherein only minor inclusions of foreign material occur in the laminate, thus eliminating the danger of the formation of non-bonded spots or the occurence of tension crack corrosion.

Other objects and further scope of applicability of the present invention will become apparent from the detailed description given hereinbelow; it should be understood, however, that the detailed description and specific examples, while indicating preferred embodiments of the invention, are given by way of illustration only, since various changes and modifica-tions with the spirit and scope of the invention will become apparent to those skilled in the art from this detailed description.

Pursuant to the present invention, it has been found that the abovementioned disadvantages may be eliminated and a much improved metal laminate product and process for manufacturing said laminate may be obtained by providing that the spacers between the metal sheets are wound from a wire in the shape of a (coil or helix, and are disposed between the metal sheets with the axis of the spiral being parallel with respect to the metal sheets.

In this type of preparation of laminated material, only a minor amount of foreign material with respect to its volume is included in the laminate. The coils or helices also possess a considerable supporting capacity. Because of the use of a thin wire, the spacer presents practically no resistance at all to the air escaping during impingement of the sheets. The wire coil or helix is welded into the laminate in the form of a fine zig-zag band.

In an advantageous embodiment of the invention, the spacer consists of the material of which one of the metal sheets to be bonded is made. The spacer can also consist of another material, insofar as such material does not form any brittle alloys with the metal sheets to be bonded. It is particularly advantageous to employ a soft iron wire for producing the coil or helix, said wire being hardened due to the stress produced during coiling.

In order to prevent the spirals from rolling away during their distribution on the sheet metal surface, or during transport prior to cladding they can be fixed by spot welding.

BRIEF DESCRIPTION OF THE DRAWING

The present invention will become more fully understood from the detailed description given hereinbelow and the accompanying drawing which is given by way of illustration only and thus is not limitative of the present invention and wherein, The single FIGURE shows an arrangement of the individual layers of a laminate structure in a sectional view prior to the conductance of the explosive plating step.

DESCRIPTION OF THE PREFERRED EMBODIMENTS

Referring now to the drawing, the lower metal sheet is designated by 1. On this sheet, several helically shaped thin metallic wires 2 are disposed, said wires lying flat in a suitable arrangement. Of these wires, only one is visible in the drawing. On top of these wires rests the upper sheet 3, on top of which, in turn, the layer 4 of explosive material is provided. This layer is equipped with a primer (detonator or igniter) not shown herein, so that the layer can be detonated starting on one side and, during this process, progressively bonds the two metal sheets 1, 3 together. The wire 2 is incorporated into the welding bond and forms a zig-zag shaped inclusions which, however, are kept small due to the small thickness of the wire.

The metal wires 2 consist, for example, of a soft iron wire having a thickness of about 0.1 mm – 0.8 mm. During the winding of the wire into the shape of a helix, the outer diameter of which is equal to the required spacing between the sheets, the wire is stretched and thus hardens (increases in strength), so that the wire which thereafter is also pulled apart in the longitudinal direction can withstand considerable stresses without buckling. During cladding, the air driven out of the interstice between the sheets does not encounter any resistance, and relatively little foreign material is introduced into the bonding surface, so that no faults are produced. The wires can also be produced of the material of the sheets to be bonded. In this connection, care must be taken to ensure that the wires can bear the weight of the explosive-laden top metal sheet 3, without buckling.

The following example is exemplary of the present invention and accordingly is not to be considered as limiting.

EXAMPLE

A laminated material of a titanium metal sheet having the dimensions of 3,000 mm × 1,500 mm × 2 mm is bonded to a boiler plate H II (steels employed for boiler construction, for example, steel containing the U.S. designation ASTM A 201 A & B Fb.Q, ASTM A 204 A,B,C Fb.Q, and the like) of the same length and width and a thickness of 15 mm. In this connection, the helically shaped wire; consisted of a soft iron wire having a diameter of 0.3 mm., coiled into spirals of a diameter of 3 mm. The wire was pulled apart to five times its original length, cut into sections, and these sections were distributed at distances of about 200 mm to 300 mm. from one another over the entire surface area. After the explosive plating, it was found that no faults had been produced, and that the laminated material did not exhibit any raised spots visible on the surface.

In other examples, a copper metal sheet, containing, for example, about a 1 mm thickness, can be plated into carbon steel using a soft copper wire having a thickness of, for example, about 0.2 mm, and rolled into helix having a diameter of, for example, about 2.5 mm. Also, an aluminum metal sheet (grade 1100), containing a thickness of, for example, about 2 mm can be plated onto carbon steel (C 1008) using a soft iron wire having a thickness of, for example, about 0.15 mm and rolled into helices having a diameter of, for example, about 3 mm.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A composite suitable for lamination com-prising at least two metallic sheets to be bonded together, metallic spacers wound in a helical shape from a wire disposed between and in supportive contact with said metallic sheets, the axis of the helix being oriented substantially parallel with respect to the metal sheets, and a layer of explosive provided on the upper metallic sheet.

2. The composite of claim 1, wherein the metallic sheets are titanium and the metallic spacers are soft iron wire helices.

3. The composite of claim 1, wherein one metallic sheet is titanium, the other is steel and the metallic spacers are selected from the group consisting of iron, titanium and steel.

4. The composite of claim 1, wherein one metallic sheet is copper, the other is steel and the metallic spacers are made of copper.

5. The composite of claim 1, wherein one metallic sheet is aluminum, the other is steel and the metallic spacers are made of iron.

* * * * *